United States Patent
Antonik et al.

(10) Patent No.: US 10,361,766 B2
(45) Date of Patent: Jul. 23, 2019

(54) SPACE-TIME CODING WITH SIGNAL SEPARATION

(71) Applicant: THE UNITED STATES OF AMERICA AS REPRESENTED BY THE SECRETARY OF THE AIR FORCE, Washington, DC (US)

(72) Inventors: Paul Antonik, Poland, NY (US); John D Matyjas, New York Mills, NY (US); Michael C Wicks, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/914,385

(22) Filed: Mar. 7, 2018

(65) Prior Publication Data

US 2018/0331751 A1 Nov. 15, 2018

Related U.S. Application Data

(62) Division of application No. 15/592,096, filed on May 10, 2017.

(51) Int. Cl.
| | | |
|---|---|---|
| *H04B 7/06* | (2006.01) | |
| *H04B 7/08* | (2006.01) | |
| *H04B 7/0413* | (2017.01) | |
| *H04L 1/06* | (2006.01) | |
| *H04B 7/10* | (2017.01) | |
| *H04B 7/185* | (2006.01) | |

(52) U.S. Cl.
CPC ......... *H04B 7/0891* (2013.01); *H04B 7/0413* (2013.01); *H04B 7/0615* (2013.01); *H04B 7/0669* (2013.01); *H04L 1/06* (2013.01); *H04B 7/10* (2013.01); *H04B 7/185* (2013.01)

(58) Field of Classification Search
CPC ... H04B 7/0891; H04B 7/0413; H04B 7/0615
See application file for complete search history.

(56) References Cited

U.S. PATENT DOCUMENTS

| | | | | |
|---|---|---|---|---|
| 5,534,869 A | * | 7/1996 | Harman | G08B 13/2497 340/850 |
| 2002/0123371 A1 | * | 9/2002 | Miyoshi | H04B 7/0615 455/562.1 |
| 2003/0114169 A1 | * | 6/2003 | Okamura | G01S 3/48 455/456.1 |
| 2013/0128820 A1 | * | 5/2013 | Yuan | H04W 36/385 370/329 |
| 2014/0307704 A1 | * | 10/2014 | Arogyaswami | H04B 7/0413 370/330 |

* cited by examiner

*Primary Examiner* — Janice N Tieu
(74) *Attorney, Agent, or Firm* — Joseph A. Mancini

(57) ABSTRACT

A method for transmitting a message, including an array of signal radiating elements for broadcasting signals that are unique one from another. One each of the unique signals is associated with one each of the radiating elements. One each of a set of transmitters is in electronic communication with one each of the radiating elements, and provides the associated unique signal to each of the radiating elements. A signal generating device receives the message from a message source and transforms the message into the unique signals. The unique signals, when broadcast, spatially interfere one with another such that the message is intelligibly receivable at only one location that is predetermined by the signal generating device, and is garbled at all other locations.

9 Claims, 6 Drawing Sheets

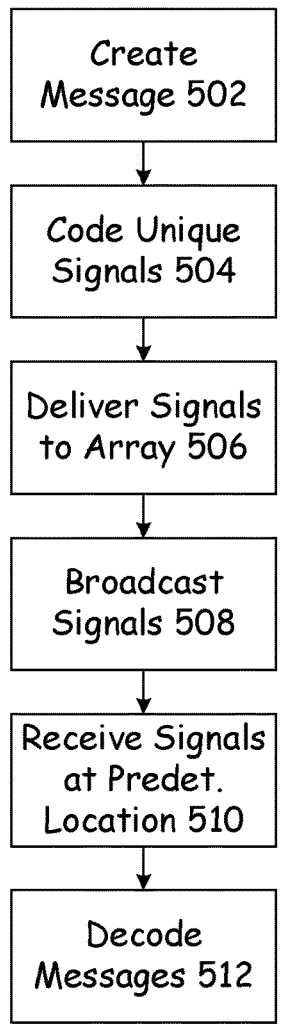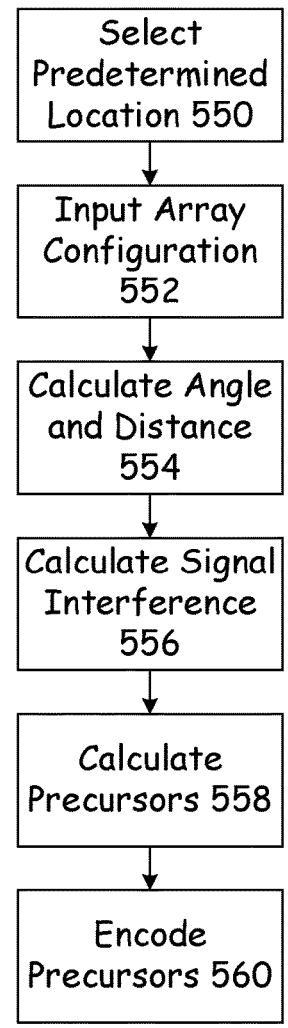
Fig. 5
Fig. 8

L = # of symbols
Δ = 2A/(l-1) = difference between one voltage and the next

SPACE-TIME CODING WITH SIGNAL SEPARATION

RELATIONSHIP TO OTHER PENDING APPLICATIONS

This patent application is a divisional of and claims any and all priority benefit from U.S. patent application Ser. No. 15/592,096 filed on May 10, 2017, now pending and incorporated by reference in its entirety herein.

GOVERNMENT INTEREST

The invention described herein may be manufactured, used, and licensed by or for the Government of the United States for all governmental purposes without the payment of any royalty.

PRIORITY

This application claims rights and priority on prior pending U.S. provisional patent application Ser. No. 62/333,879 filed 2016 May 10, the entirety of which is incorporated herein by reference.

FIELD

This invention relates to the field of radio communications. More particularly, this invention relates to the creation, broadcast, and reception of radio transmissions that contain different information depending upon the location and time at which the transmissions are received.

INTRODUCTION

There are many reasons why a sender and a receiver of a radio transmitted message would want the message to remain private—meaning, that the contents of the message would only be understood in a meaningful way by the sending and receiving parties, and not by any third party, such as an interceptor of the message.

For example, those who relay messages in regard to financial information, health care information, or battle information all have a high degree of interest in maintaining the privacy of their messages.

In the prior art, messages are kept private in a variety of ways, such as by encrypting the messages. However, if the decryption key for the message is discovered by an interceptor, or if the interceptor applies brute-force computing to the message, then the message can be decoded. Such exploits tend to eventually be found for each method by which messages are kept private.

What is needed, therefore, is a communication system that reduces issues such as those described above, at least in part.

SUMMARY

The above and other needs are met by a method for transmitting a message that includes an array of signal radiating elements for broadcasting signals that are unique one from another. One each of the unique signals is associated with one each of the radiating elements. One each of a set of transmitters is in electronic communication with one each of the radiating elements, and provides the associated unique signal to each of the radiating elements. A signal generating device receives the message from a message source and transforms the message into the unique signals. The unique signals, when broadcast, spatially interfere one with another such that the message is intelligibly receivable at only one location that is predetermined by the signal generating device, and is garbled at all other locations.

In some embodiments, the radiating elements are antennas. In some embodiments, the array is a MIMO array. In some embodiments, the array is a sparse MIMO array. In some embodiments, the array is a statistical MIMO array. In some embodiments, the message that is intelligibly receivable at the one predetermined location is encrypted. In some embodiments, the message that is intelligibly receivable at the one predetermined location is compressed. In some embodiments, the message that is garbled at all other locations is receivable as intentional misinformation. In some embodiments, the spatial interference between the unique signals is constructive interference. In some embodiments, the spatial interference between the unique signals is destructive interference. In some embodiments, a plurality of messages is concurrently received from the message source, and the unique signals, when broadcast, spatially interfere one with another such that different ones of the messages are only intelligibly receivable at one location per each one of the messages, which locations are predetermined by the signal generating device, and are garbled at all other locations.

DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 5 is a flow chart for a method of broadcasting a message according to an embodiment of the present invention.

FIG. 8 is a flow chart for a method of creating the precursor unique signals according to an embodiment of the present invention.

DESCRIPTION

Figure 1:
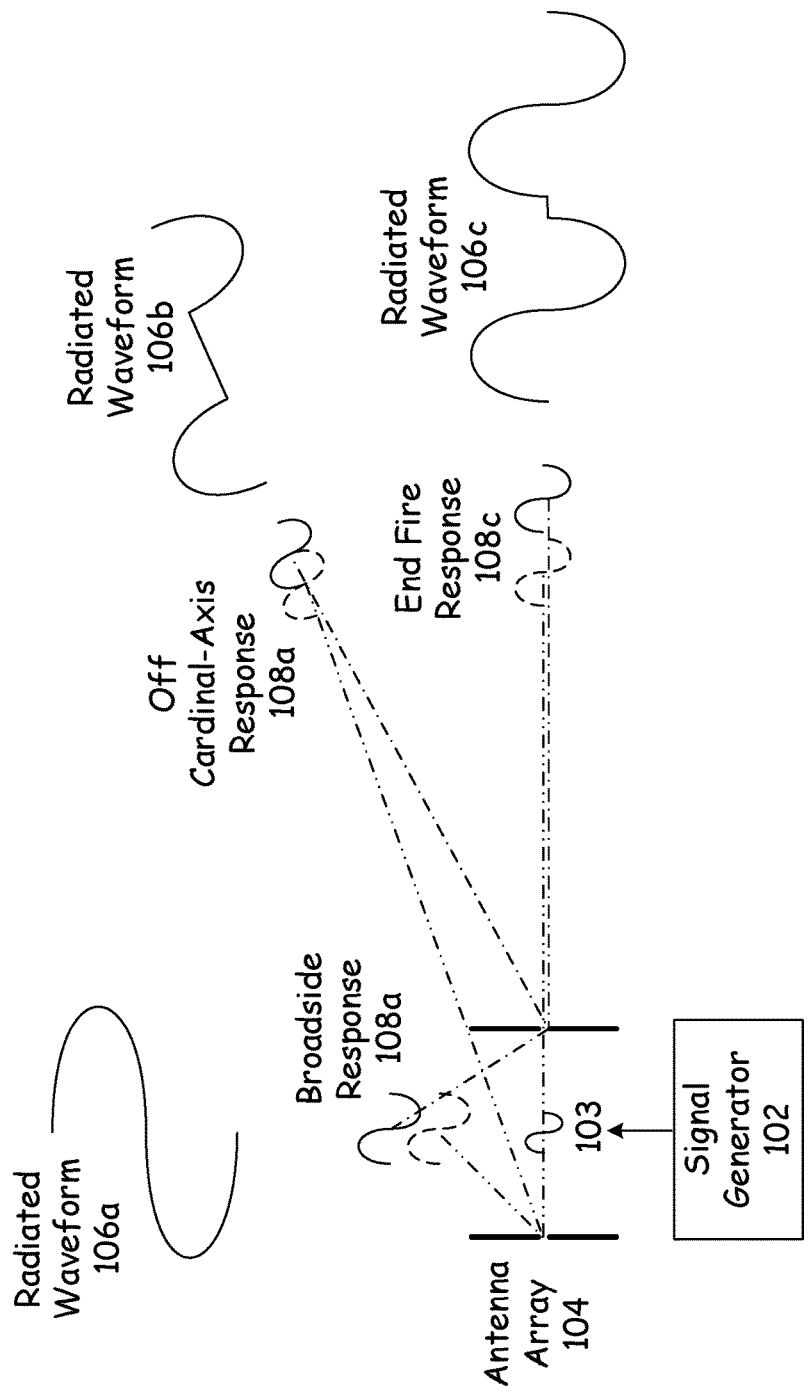
FIG. 1 is a diagram of signal responses for frequency and phase scanned arrays according to an embodiment of the present invention.
Figure 2:
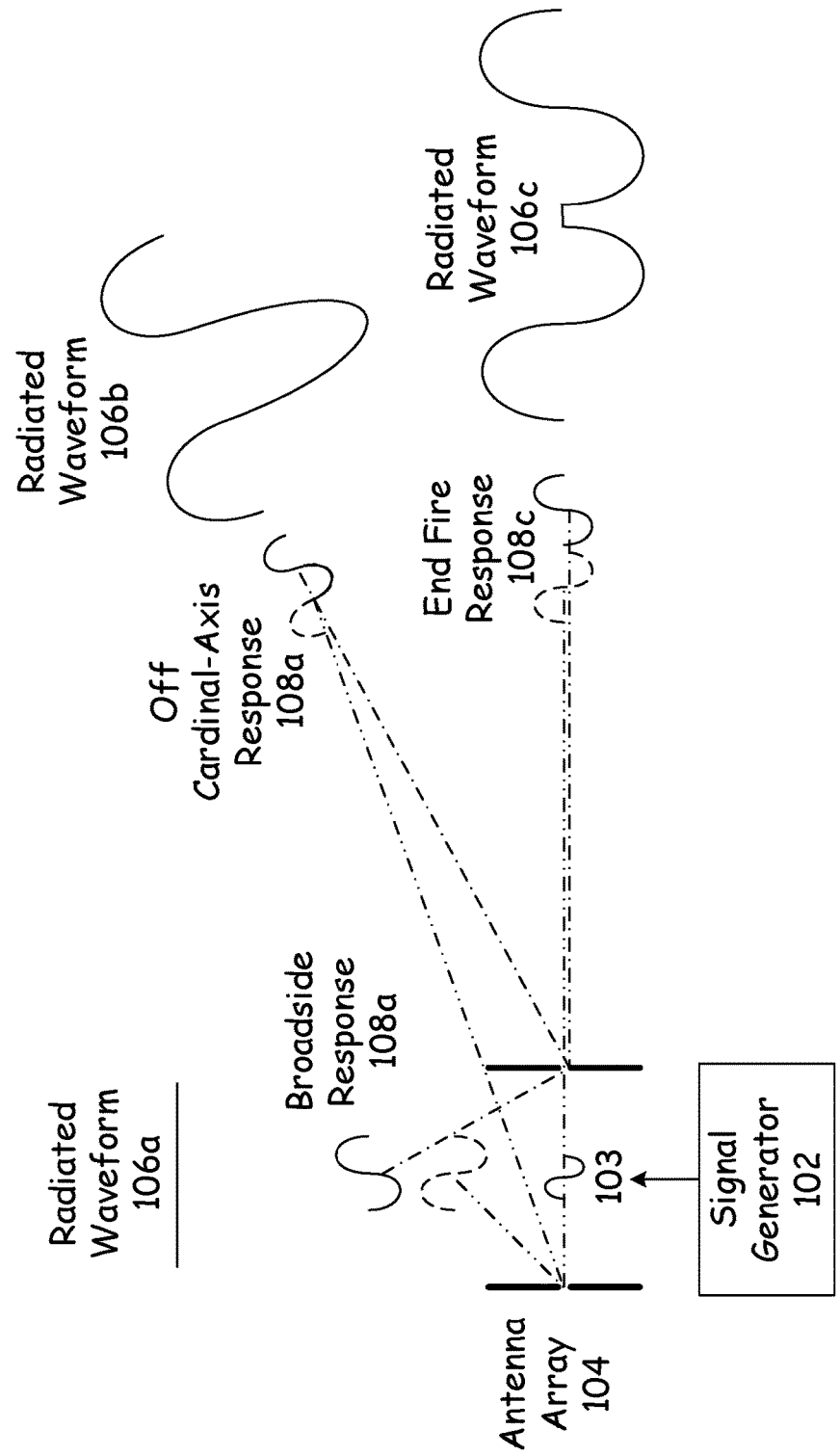
FIG. 2 is a diagram of signal responses for an adaptive array according to an embodiment of the present invention.

Radio frequency signals transmitted from an array of radiating elements, such as antennas, add constructively and destructively as a function of angle. This is depicted in FIGS. 1 and 2. In each figure there is depicted a signal generator 102, such as a transceiver, which sends a signal 103 to radiating elements 104, such as antennas in an array. In the embodiment as depicted, there are two antennas in the antenna array 104, and the same signal 103 is sent out on each of the two antennas.

Because of the physical (spatial) separation between the two antennas in the array 104, the signal responses 108 are different at different angles to the array 104. For example, the signal response 108a in the broadside position has one form, such as that depicted, with a radiated waveform 106a where the overlapping signals are coincident in time, and thus double the voltage of the signal. The signal response 108b in the off cardinal-axis position has a second form, such as that depicted, with a radiated waveform 106b where there is a partial overlap of the signals, and a spatial-temporal cancellation of a part of the signal results. Finally, the signal response 108c in the end fire position has a third form, such as that depicted, with a radiated waveform 106c where the signals do not overlap at all.

Thus, even when the same signal 103 from the transceiver 102 is broadcast from the array 104, the radiated waveforms 106 vary as a function of transmitted angle from the antenna array 104.

In frequency and phase scanned arrays 104 as depicted in FIG. 1, the frequency or phase of the radiated signal 106 is varied as a function of time, causing the direction of the main beam of the antenna pattern 104 to also vary as a function of time.

In adaptive arrays 104, as depicted in FIG. 2, the amplitudes and phases of the elements (antennas) are varied to alter the radiated pattern 106, typically to place spatial nulls in the direction of an interfering source on receive. As depicted, the broadside response 108a has overlapping signals that are coincident in time, resulting in a zero voltage and far field cancellation of the signal 103. The off cardinal-axis response 108b experiences a spatial-temporal reinforcement due to a partial overlap of the signals, resulting in the waveform 106b. Finally, the end fire response 108c has non-overlapping spatial-temporal signals, resulting in the waveform 106c.

The various embodiments of the present invention make use of this phenomenon—different waveforms present at different angular positions to the array 104—to accomplish three goals: (1) increase the information-carrying capacity of the available spectrum, (2) increase the integrity or robustness of the information transmitted, and (3) increase the privacy of the transmitted information, all as described in greater detail below.

This disclosure describes a new messaging architecture in which additional coding is applied to the base signal or message 103 as a function of array 104 angle, such that the message signal 106 received at one angle is different from that received at any other angle. This can allow multiple, different signals 103 to be transmitted simultaneously to different users who are positioned at different angles to the array 104, and can reduce interference effects. This is generally referred to herein as space-time coding.

The architecture can be implemented with multiple-input multiple-output (MIMO) communications, using multiple antennas 104 at one or both of the transmitter 102 and the receiver, to send more than one data stream simultaneously at each angle. MIMO can also be used for greater robustness via redundancy, where a single data stream is coded and multiplexed across the transmitting antenna elements 104.

In some embodiments of this multi-dimensional approach, MIMO communication is combined with compressive sampling and data coding so as to provide increased capacity, robustness, and an additional layer of security for the communications. The MIMO used in some embodiments is one in which the information content of the radio signal 103 is a function of the angle of the array 104 (look direction), achieving a form of combined directional coding and modulation, beyond that which is provided by prior art MIMO or antenna pattern effects.

With this directional coding and modulation, a radio signal 103 contains a unique signal in each resolvable angle of the array 104. In other words, the message transmitted at one angle is not present in the emissions at other angles, even though other intentional messages may be present at those other angles. A receiver at one of those other angles, meaning any receiver designed to detect information about electromagnetic emissions in the desired message angle (called the main lobe herein), will be unable to capture the message via side lobe sensing. Further, because of the spacing between the radiating elements 104, the signals 108 combine differently not only at different angles of reception from the array 104, but also at different distances of reception from the array 104. Thus, the spatial location for proper reception of the message can be quite finely tuned by adjusting the characteristics of the unique signals 108 as broadcast.

Figure 3:
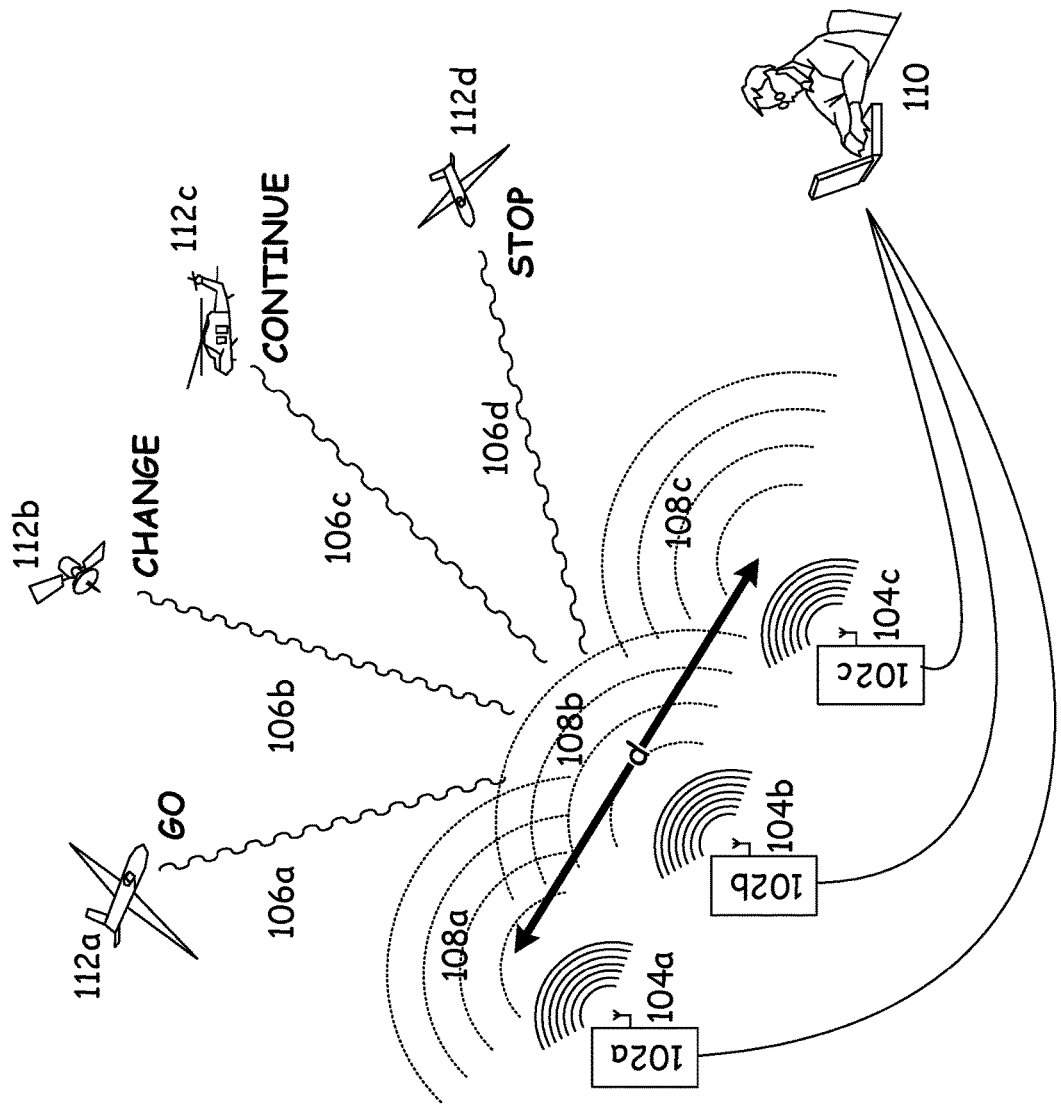
FIG. 3 is a diagram of MIMO space-time coding according to an embodiment of the present invention.

With reference now to FIG. 3 there is depicted an example of MIMO space-time coding, according to an embodiment of the present invention. Four messages are generated and broadcast from a single MIMO array 104 using directional modulation. These four different messages are received at four different locations. Each message is in phase only in a single direction. Each message can also be encrypted with either the same or different encryption architectures or keys, so that only the receiver in the proper location is able to receive and decrypt the intended message for that location. The encryption architecture or keys for each of the four messages can be all the same, all different, or some combination in between.

A compact MIMO array 104 is one in which the distance d between the antennas that are farthest apart in the MIMO array 104 is no more than about the number of antennas in the array times the wavelength that is radiated from the array 104. In other words, each antenna in the MIMO array 104 is no further apart from its nearest neighbor antenna in the MIMO array 104 than a single wavelength.

In space-time coding with compact MIMO, antenna spacing is small, and a coherent multichannel phased array is used for transmission. In this embodiment, one implements separate, yet fully coherent, waveform generation, timing, and control at the subarray or antenna element 104 level. In this embodiment, a form of spatial multiplexing is employed in which unique in-band signals are radiated from each element 104 or subarray. The various emissions cohere differently as a function of the angle of the broadcast from the array 104.

Large signal bandwidth (100% of available spectrum) is required to achieve directional modulation via spatial multiplexing in compact MIMO with a traditional aperture employing half-wavelength spaced elements 104. By employing more widely spaced radiating elements 104, a proportional reduction in signal bandwidth is achieved, but at the expense of a larger aperture and grating lobes. A 50% bandwidth signal is still required when using an array antenna 104 with elements spaced one wavelength apart.

For more widely spaced elements 104 (or antennas), such as antennas that are spaced apart by a distance d of about ten wavelengths, only 5% of the signal bandwidth is required. This is referred to as sparse or thin-spectrum arrays, wherein even less contiguous bandwidth is required. It is important to consider that each subarray or element 104 is radiating in-band, and as such, frequency division multiplexing is not required At even greater spacings d of the antennas 104, so-called sparse MIMO is employed. If no regular geometry or pattern of radiating elements 104 is used, the architecture is called statistical MIMO. In some embodiments, a random yet known pattern of radiating elements 104 is preferred. With an un-calibrated pattern of radiating elements 104, a self-cohering sparse array is beneficial in some embodiments. This may be accomplished at the receiver with modern architectures for waveform generation, timing and control.

In some embodiments of spatial multiplexing with space-time coding, different in-band signals are radiated from each radiating element 104. As explained above, in the far field of a distributed MIMO array, a unique radio signal is radiated in each angular direction of the array 104. These emissions cohere or "time" differently as a function of look direction (angle), and the information content of the composite radiated signal is a unique function of transmit look direction.

In space-time coding with statistical MIMO, the message to be transmitted is transformed, parsed, and coded in the time domain. Then, each message component is relayed to only one of several or more transmit stations/locations 102. A doubly coded space-time message may be computed across the spatially distributed MIMO apertures 104 and radiated across the sparse array. In some embodiment, all transmissions are timed and possibly phase-locked, where the timing information is required at the receiver in order to decode the message. The relative timing of each transmission can be a part of this space-time coding process.

Each individual distributed MIMO transmitter 102 may be implemented, in some embodiments, with the compact MIMO construct described above. In other words, one of more of the transmitters 102 with antenna 104 can be implements as two, three, four, or more separate transmitters 102 that are in a compact MIMO configuration. That compact MIMO configuration is then used as one radiating element of a sparse or statistical MIMO configuration. This architecture further codes (and thereby protects) the information being transmitted, thereby achieving what can be called an "encoding of encoded data." This nested architecture provides the basis not only for improved information protection, but for degrees of signal compression that vary as a function of look direction. As such, compatibility with fielded communications technologies is more readily assured.

In yet another embodiment, space-time coding is implemented with polarization of the signal. For ground stations, or for MIMO transmitters operating in close proximity to other infrastructure, this may complicate the design of waveforms and apertures, while constraining the placement geometry. Still, the exploitation of polarization tends to increase channel capacity and robustness.

Thus, statistical MIMO with space-time coding establishes a localized wireless messaging capability for assured communications and robust, even anti-fragile, code. Orthogonality of the architecture provides for embedded interference rejection, because the message exists only in proximity to an intended location centered at a desired position within a radius R, where R is an independent design parameter. The intended recipient must be present during a specific period of time.

Figure 4:
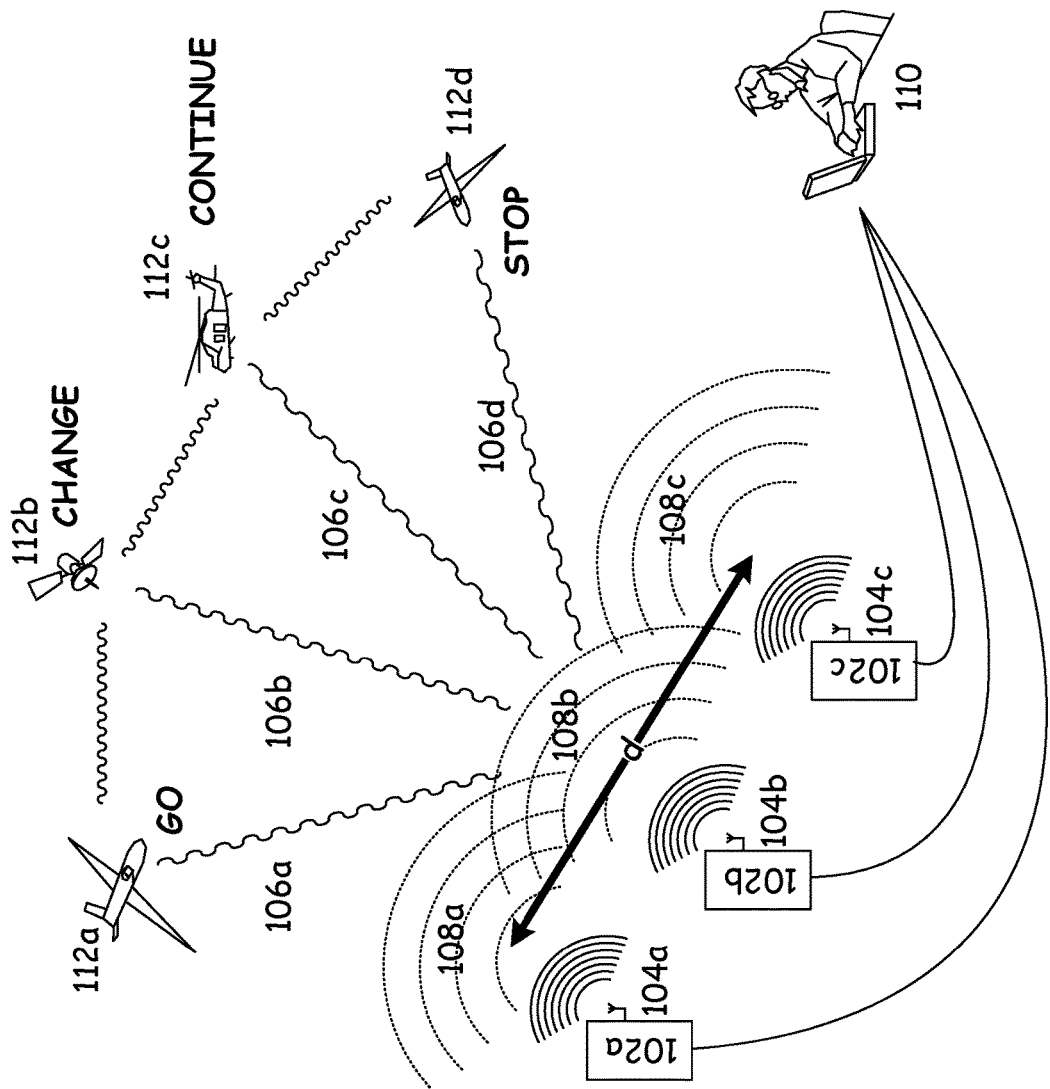
FIG. 4 is a diagram of transceivers in a compact MIMO configuration and receivers in a statistical MIMO configuration according to an embodiment of the present invention.

FIG. 4 depicts an embodiment where the transceivers 102 are in a compact MIMO configuration, and the receivers are in a statistical MIMO configuration, which is a more general space-time coding architecture. In an embodiment such as this, a given one of the receivers, 112a for example, can emit a signal that can further spatially interfere with the signals 108, such that it enables an intelligible message to be receivable at a different location, such as 112b, for example.

The space-time coding architecture described herein improves upon traditional key generation architectures, exploits additional dimensions for "signal in space" separation and co-design. For some directional coding and modulation embodiments, the public key is a function of look direction, and is useless when applied from any other look direction. In some embodiments, each public key requires a unique private key for decoding as a function of space-time coordinates. The public and private keys in some embodiments are all unique multi-dimensional functions of look direction, time, space, coding, polarization, and geometry for the signaling of MIMO communications.

In space-time coding embodiments with coherent/compact MIMO or statistical/distributed MIMO, a cascade approach leads to a wireless communications architecture in which a message is discernable in only one direction—the desired look direction. This desired look direction is established a priori, being where an intended recipient is located (ground vehicle, aircraft, satellite, etc.). This form of space-time coding is compatible with more traditional forms of assured communications. Existing coding technology is applicable to this new architecture of information compression and protection.

Method

With reference now to FIG. 5, there are described various embodiments of a method 500 for transmitting a message, according to the present invention. The first step is to create the desired message, as given in block 502. This is accomplished such as by an operator 110, as depicted in FIGS. 3 and 4. The operator 110 uses a computerized signal generating device, such as a personal computer, which creates a plurality of unique signals 108, as given in block 504, that are delivered to the array 104, as given in block 506. The unique signals 108 are precursors to the reconstitution of the desired message 106 at the spatial location of the intended message recipient 112.

The number of unique signals 108 into which the desired message 106 is parsed is based, in some embodiments, upon the number of radiating elements 104a, b, and c, etc. that are present in the array 104, such as one unique signal 108 per radiating element 104. However, in other embodiments the number of unique signals 108 created is less than the number of radiating elements 104, and at least a given one of the unique signals 108 is delivered to more than one of the radiating elements 104.

The computerized device creates the unique signals 108 such that the radiating signals 108, when broadcast as given in block 508, spatially interfere one with another (either constructively or destructively, as described above in regard to FIGS. 1 and 2) and create a signal 106 that contains the desired message in an intelligible format when received at the proper location 112a, b, c, or d, as given in block 510, and as depicted in FIGS. 3 and 4. This is accomplished by inputting the desired spatial location 112 for the receipt of the message 106, such as angular position with respect to the array 104 and the distance from the array 104 to the desired spatial location 112 into the computerized device used by the operator 110.

For example, the unique signals 108 can be created such that the message GO is received at spatial location 112a, while the signals 108 spatially interfere one with another to produce unintelligible (or garbled) messages at all other spatial locations 112b, 112c, and 112d (for example).

In some embodiments, the signals 108 are created such that the spatial interference creates intelligible messages at several different spatial locations 112. In some of these embodiments, only one of the intelligible messages 106*a*, such as the one at location 112*a*, is a desired message—or in other words, contains accurate information—while at the other locations 112*b* and 112*c* for example, the intelligible messages 106*b* and 106*c* contain intentionally false or misleading information. In other embodiments, each of the messages 106*a-d* received at the different spatial locations 112*a-d* is both an intelligible message and contains desired information instead of false or misleading information.

All of this encoding is performed, in some embodiments, by the computing device used by the operator 110, when the unique signals 108 are created. The signals 108 are then delivered to the transmitters/transceivers 102, and broadcast out on the array 104.

In some embodiments, the intelligible message 106*a* that is received at the predetermined spatial location 112*a* (for example) is at least one of compressed and encrypted, such that it must be decoded as given in block 512 before it is meaningful to the receiver. This provides an added layer of security in the transmission of the message 106, as the receiver 112 must not only be present at the predetermined spatial location to receive an intelligible message, but then must decompress and decrypt that message according to whatever compression and encryption protocols have been used.

With reference now to FIG. 8, there is described a method 504 for creating the unique precursor signals 108, according to an embodiment of the present invention, as previously recited briefly above in regard to box 504 of FIG. 5. It is appreciated that some of the steps may be performed in an order that is different from that as depicted in FIG. 8 and recited below.

One of the first steps is to select the predetermined spatial location 112 where the intelligible message is to be received, as given in block 550. Another first step is to input the array 104 location and configuration, as given in block 552, including the positions of the various radiating elements 104*a-c* (for example). It is appreciated that either of these steps could be performed before the other, but in some embodiments, both are performed before proceeding with the method as depicted. In some embodiments, the array 104 configuration is always known, and is hardwired into the method. In other embodiments, the array 104 configuration is variable over time, and is input anew with each message to be broadcast.

The information gathered in steps 550 and 552 are used in step 554, which is to calculate the angle and distance between the array 104 and the predetermined message receipt location. Once this angle and distance are known, then the interference that will occur between transmitted signals at the predetermined message receipt location 112 can be calculated, as given in block 556. Once it is known how broadcast signals will affect one another at the predetermined location, the actual precursor signals 108—that will combine as determined in block 556—can be calculated as given in block 558. In some embodiments, these unique precursor signals 108 are further processed in block 560, such as by one or more of compression, encryption, or other signal processing. In some embodiments, the unique signals 108 are encoded such that the desired message 106 is compressed and encoded according to desired protocols.

Creation of the Unique Signals

Without being limited by the theory described below, there is next presented a discussion on the possible methods by which the unique signals are created. This processed is referred to herein as Space-Time Encoding and Processing (STEP).

STEP combines advanced modulation techniques with MIMO-like directional dependence on transmit (information content that is a function of spatial and temporal coordinates) and homomorphic processing on receive, in order to provide a new end-to-end architecture for enhanced information security in radio frequency communication systems. With this technology, additional layers of security may be applied to existing methods as well as emerging wireless communications. In STEP, an encoded message is uniquely a function of angle and, in some embodiments, time and/or distance. Classical sidelobe intercept receivers are ineffective against this technology. With STEP, even modern intercept receivers are ineffective.

In some embodiments, STEP employs homomorphic processing and distributed aperture antennas (with associated waveforms) at the command center transmitter (possibly even the forward-based transmitter) to improve both efficiency and security.

Homomorphic Processing (HP)

HP has dual goals: (1) to increase the effectiveness of the data encoding in protecting the data by accomplishing as much of the processing/analysis as possible in the encoded domain, and (2) to improve the efficiency of the data processing/analysis chain.

HP will differ depending upon the type of data in the message (speech, signals, images, threshold crossings, etc.), and upon user requirements. HP addresses separately and jointly: verbal content (text, audio, Web), signals (RF, landline, Web) and images (photography, EO, IR, radar). Parameters differ from one HP application to another, but there are underlying principles that will support all instantiations of HP: (1) progressive transmission of data, (a) from open access to private data, (b) progressively more critical and thus more restricted, (c) images from vague to sharp, (d) compressive sampling (CS) based on a dictionary of critical terms to improve efficiency, (e) extended CS based on an encyclopedia of activities and an atlas of multiple domain of things.

(2) Patterns or template(s) of objects, signals, or activities that are of importance to the user, which patterns or templates are transformed into the encoded domain, (3) hoteling's t-squared test, also applied in the encoded domain, where the existing test for analysis of 2-D images is extended to speech and other signals, and a test for multiple domain data sets can be developed. Common to all of these tests is: (a) integration over the patterns/templates to improve performance in noise, (b) adaptive rejection of similar signals/objects/activities to improve performance in complex environments, and (c) a single scalar test metric that converts the image, signal or other data analysis effort into a scalar declaration decision.

(4) Iterative focusing to signals of interest (SOI's), regions of interest (ROIs), and activities of interest (AOIs).

Similar algorithms of this nature have been applied to the analysis of SAR imagery. Take, for example, the input to a simulation of this algorithm with the object of interest to the user being a straight wire. After the image is formed, the data from the object of interest covers a number of range-Doppler pixels and is difficult to analyze. A template of the object of interest is implemented and the integration and adaptive rejection processes applied. The resulting test statistic can be autonomously analyzed for the existence and the location of the object.

In some embodiments, STEP uses a similar development for each of the other applications: photography, EO/IR imagery (real value data rather than the complex data of SAR images), and signals/speech analysis (in time/frequency history rather than in imagery). Detecting AOI (Activity of Interest) require the development of a multiple-domain approach, including patterns and templates that cover those domains.

The Distributed Aperture Waveforms (DAWs) component of STEP uses a distributed-aperture transmitter to maintain the BER that existed with a single aperture transmitter to receiver channel, while increasing the BER for channels (paths) to potential eavesdroppers. The BER is affected by channel noise, interference (intentional, nonintentional), waveform distortions of various kinds and multipath fading.

In one embodiment, the performance in Gaussian white noise is addressed. In one embodiment, the antenna pattern takes into account component errors and a limited amount of multipath. These effects limit the depth of the nulls that can be achieved both by the dish antenna and by the distributed array. In the antenna pattern for a typical dish antenna, the mainbeam points toward the intended receiver, while the eavesdropper operates in the sidelobes. It is assumed that the eavesdropper has a large enough aperture and is close enough in range to operate from his location and in his sidelobe of choice. Thus, the signal received by the eavesdropper equals or exceeds that received by the intended receiver. Thus, both will have the same SNR and thus the same BER for the case of a single dish antenna.

The locations of the peaks and nulls in a section of an antenna pattern of a 1,000 wavelength distributed aperture antenna at one frequency sub-band are a function of frequency sub-band. At a mere 0.3° from the direction of the intended receiver, a 10% change in frequency moves a peak to the location of an adjacent null. At 3° or greater, only a 1% change in frequency is required to cycle through the peaks and nulls. The Eavesdropper will receive some of the sub-bands with a few dB improved signal level while other sub-bands will be greatly attenuated, reducing SNR and increasing BER. By developing an encoding approach that requires all sub-bands simultaneously, we can significantly degrade the information received by the Eavesdropper.

For Baseline System parameters (1 meter C-band dish, See below) the gain of each dish is about 35 dB. Multipath and errors limits the depth of nulls to −5 to −10 dB relative to isotropic. This limits the deterministic dynamic range of the dish to 40 or 45 dB. The 5-element distributed aperture provides an additional 7 dB of gain, and thus provides additional dynamic range. In geometries with limited multipath (look up geometries) an additional 10 dB of dynamic range is possible. Thus, the eavesdropper could face an additional 10 dB or more of loss in signal for those sub-bands that have a null pointed at it. This, in turn, causes a significant increase in BER.

Because of the complexity of the distributed aperture pattern of some embodiments, the calculation of BER cannot be performed analytically, but may be evaluated using a Monte Carlo simulation. For each frequency sub-band and for each potential eavesdropper location, the signal to noise is calculated for the single aperture system and for the distributed aperture system. From these SNR values the BER is determined.

The BER is different for each frequency sub-band. Since the message is spread across sub-bands, these BERs are averaged and then compared to the performance of a single aperture transmitter. BER performance is different for various eavesdropper locations, and so average performance is calculated. Multi-variate correlation is determined and employed in the development and evaluation of encoding schemes.

Baseline Distributed Aperture System

In some embodiments, the baseline distributed aperture system has the following characteristics:
1. Five antenna elements
   a. C-band 1 meter dishes
   b. Approximately linear sparse array over 75 meters
   c. Approximately exponential spacing (5 m, 10 m, 20 m, 40 m)
2. Use seven frequency sub-bands; all sub-bands are radiated from each element
   a. Orthogonal codes from each element at each frequency (35 codes)
      i. Sidelobe performance at the same frequency with different codes
      ii. Separation of codes at the intended receiver
   b. Same total power as single aperture transmitter
3. Baseline Waveform
   a. Employ a thirteen element Barker Code in time at each frequency
      i. OFDM and Costas waveforms as an alternative
   b. Initialized at each frequency to achieve best flatness in autocorrelation domain/as close as possible to a seven element Barker Code across frequency
   c. Message is encoded sequentially to the sub-bands
4. Baseline Homomorphic Processing approach
   a. Progressive transmission of data, e.g. an image
   b. Pattern or template of objective structure
   c. Region of interest identification
   d. T2 test based algorithm (rejection of other structured signals)
      i. Algorithm exists for complex value images (processing of SAR data)

Scenario
1. Communications receiver at range R and azimuth 0°
2. Eavesdropper interceptor evaluated at range R and all azimuths +/−60°
3. SNR calculated for each frequency (ratio of 75 to 1)
   a. Main beam conventional system ~60 mrad
   b. Main beam DA system ~0.8 mrad
4. Off boresight DA
   a. Sidelobes are at different angles for the different frequency sub-bands
   b. Interceptor can be in a null at some frequencies and a sidelobe peak at others
   c. No full grating lobes exist because of the exponential spacing
5. Calculate SNR for each frequency
6. Calculate expected number of errors in a message of a given type (BPSK, QPSK, etc.) and given message length.
   a. Necessary because different parts of the message will greatly different in BER (at different frequencies).
   b. Average performance versus angle (interceptor has no information on array pattern)
   c. Mini-Max performance (interceptor understands array pattern and choses location accordingly)
7. Iterations
   a. Waveform design to improve Mini-Max performance—"even out" the error rate versus azimuth angle
   b. Implement 2 element Delta array
      i. As a jammer
         1. Revisit the above
      ii. As a false message radiator
         1. Coordinated waveform design between DA and Delta array.

c. Implement amplitude weighting on the DA
  i. Change weighting during message—at predetermined times
  ii. Little effect on main-beam—fraction of a dB
  iii. Significant change of sidelobe locations
  iv. Coordinated weighting/waveform design Step Concepts DAWs approaches are developed for each of the various amplitude, frequency, and phase encoding approaches. The last concept above—dynamic amplitude weighting of the distributed aperture transmit antenna—appears to make amplitude encoding difficult to intercept. Weighting approaches have been developed (uniform, Hamming, Blackman, or Taylor) that have small impacts on the main-beam, but have a major impact on the side-lobes. For a dish antenna, changing the weighting slowly changes the gain in the direction of the eavesdropper, but for the DA the gain in that direction varies rapidly.

Figure 6:
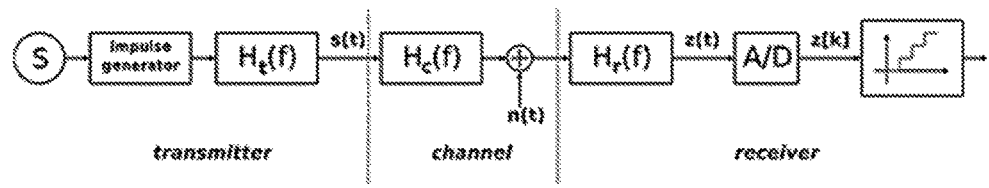
FIG. 6 is a diagram of amplitude-shift keying according to an embodiment of the present invention.

In amplitude-shift keying, as depicted in FIG. 6, the data is encoded using L symbols per pulse. If pulse-to-pulse variation in antenna weighting can be implemented. Main-beam amplitude variation $\delta \ll \Delta$. Therefore, there is little impact on the intended receiver channel BER. Side-lobe amplitude varies randomly between $-A$ and $A$, and BER is almost 1. Therefore, STEP is a complete success in this scenario.

The impact of dynamic antenna weighting on frequency-shift keying and phase-shift keying is different. BER is a function of signal to noise. The eavesdropper system (receive aperture) is sized to operate in the side-lobes of a dish antenna. Distributed apertures superimpose an array pattern. Distributed aperture gain in the eavesdropper location is random, where half of the gains will have a slight improvement of 0 to 3 dB, one quarter will exhibit moderate losses, and one quarter will have high losses, e.g. greater than 20 dB. The resulting BER will be about 25%, which is an unacceptable value.

Figure 7:
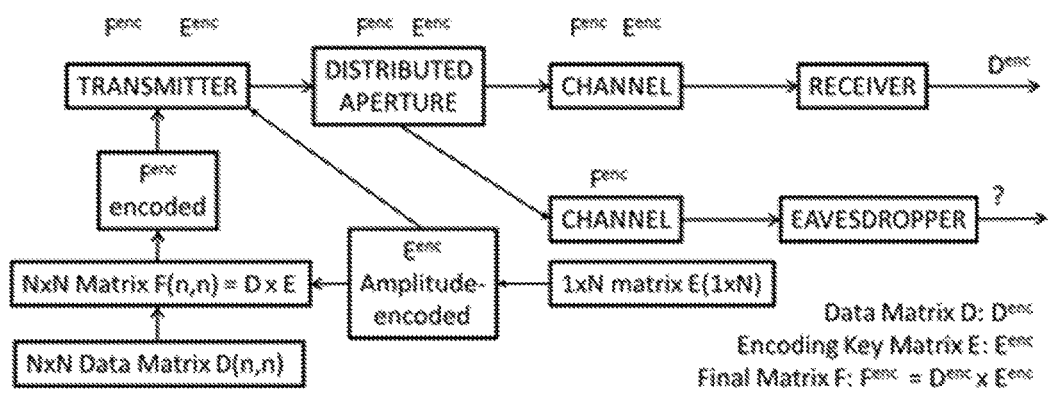
FIG. 7 is a diagram of an auxiliary matrix approach to data encoding according to an embodiment of the present invention.

If pulse-to-pulse amplitude variation is not possible, an approach using an auxiliary matrix can be implemented, as depicted in FIG. 7. This auxiliary matrix serves as a key to the code being implemented, and can be sent at a slow rate. It is amplitude encoded, and therefore, not available to the eavesdropper.

Using a distributed aperture approach and spatial-temporal modulation, critical information is denied to the eavesdropper, especially for amplitude encoded data. Also, using an encoding key and auxiliary matrix, STEP technology is applied to amplitude and phase encoded data. Homomorphic Processing is applied in the signal, image, speech, and data domains. By combining multiple domains, activities of interest can be protected from the eavesdropper.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for transmitting a message, the method comprising:
   entering a message into a signal generating device,
   selecting a predetermined location to send the message, and entering the location into the signal generating device,
   inputting a configuration of an array from which to send the message into the signal generating device,
   with the signal generating device, calculating an angle and a distance between the predetermined location and the signal generating device,
   with the signal generating device, calculating signal interference at the predetermined location between signals broadcast from the array,
   calculating signal precursors that are unique one from another, that when broadcast from the array, interfere one with another as calculated, such that signal precursors produce the message in an intelligible form only at the predetermined location, and are garbled at all other locations,
   sending the signal precursors to signal transmitters, and
   broadcasting the signal precursors with radiating elements within the array.

2. The method of claim 1, wherein the radiating elements are antennas.

3. The method of claim 1, wherein the array is a MIMO array.

4. The method of claim 1, wherein the array is a sparse MIMO array.

5. The method of claim 1, wherein the array is a statistical MIMO array.

6. The method of claim 1, wherein the message that is intelligibly receivable at the predetermined location is encrypted.

7. The method of claim 1, wherein the message that is intelligibly receivable at the predetermined location is compressed.

8. The method of claim 1, wherein the message that is garbled at all other locations is receivable as intentional misinformation.

9. A non-transitory computer-readable-medium having software instructions stored thereon, the software for instructing a signal generating device to process a message, comprising:
   entering the message into the signal generating device,
   selecting a predetermined location to send the message, and entering the location into the signal generating device,
   inputting a configuration of an array from which to send the message into the signal generating device,
   with the signal generating device, calculating an angle and a distance between the predetermined location and the signal generating device,
   with the signal generating device, calculating signal interference at the predetermined location between signals broadcast from the array,
   calculating signal precursors that are unique one from another, that when broadcast from the array, interfere one with another as calculated, such that signal precursors produce the message in an intelligible form only at the predetermined location, and are garbled at all other locations,
   sending the signal precursors to signal transmitters, and
   broadcasting the signal precursors with radiating elements within the array.

* * * * *